(No Model.)  2 Sheets—Sheet 1.
C. C. RITTENHOUSE.
JAIL OR PRISON.
No. 345,924. Patented July 20, 1886.
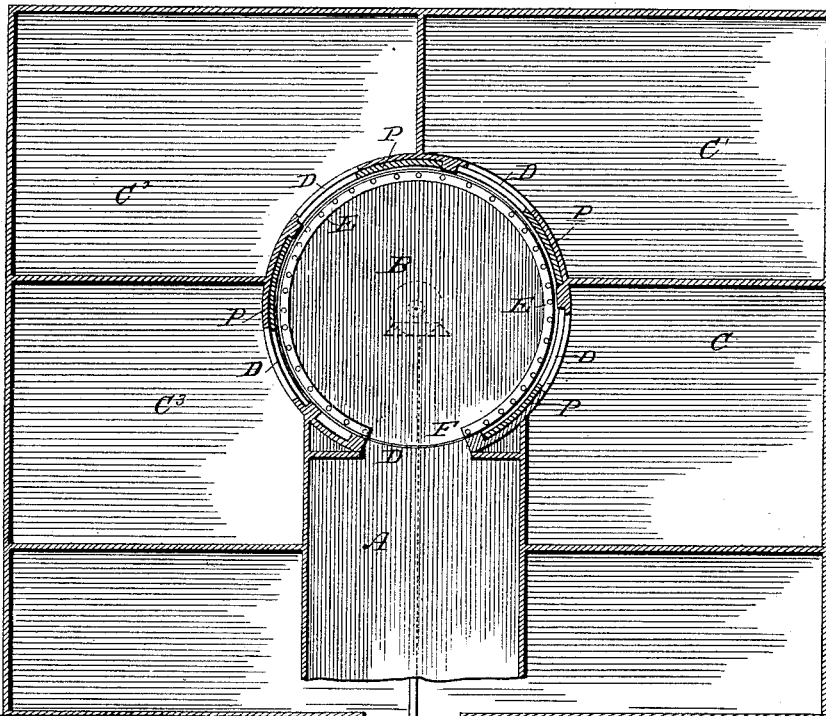
Fig. 1
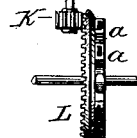
Fig. 4.
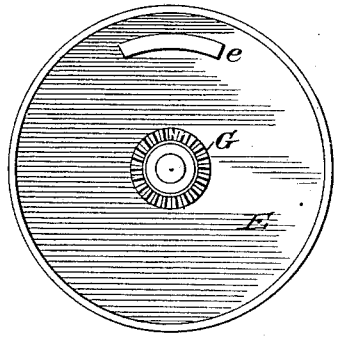
WITNESSES
Fred G. Dieterich
E. J. Underwood
INVENTOR
Chas. C. Rittenhouse
H. J. Johnston, Attorney (No Model.) 2 Sheets—Sheet 2.
C. C. RITTENHOUSE.
JAIL OR PRISON.
No. 345,924. Patented July 20, 1886.
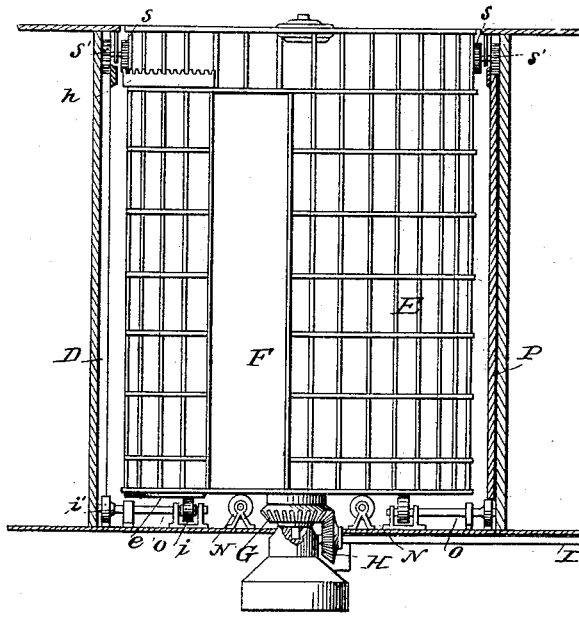
Fig. 2.
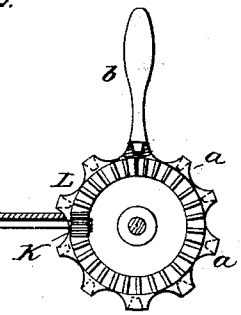
Fig. 3.
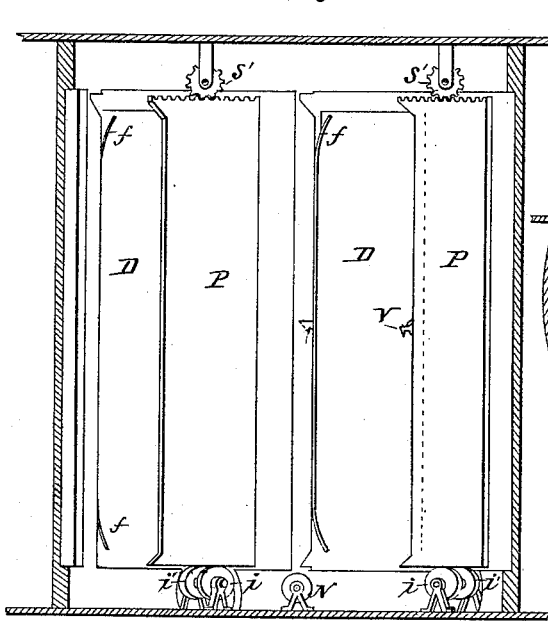
Fig. 5.
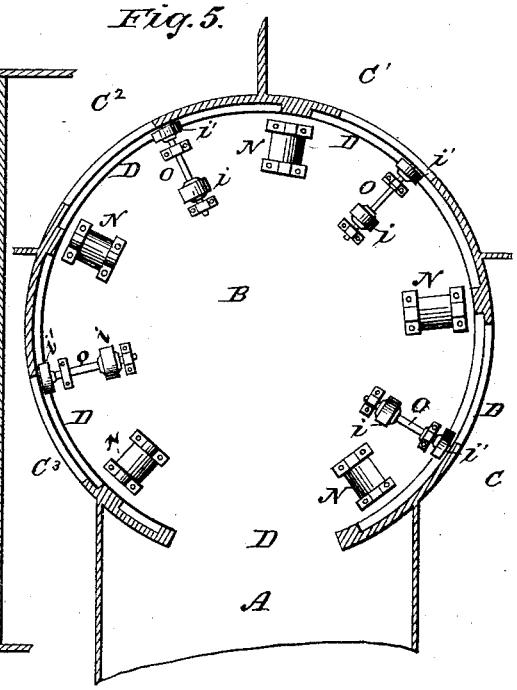
WITNESSES
Fred G. Dieterich
Ed. J. Underwood
INVENTOR
Chas. C. Rittenhouse
W. J. Johnston
Attorney

UNITED STATES PATENT OFFICE.

CHARLES C. RITTENHOUSE, OF HASTINGS, NEBRASKA.

JAIL OR PRISON.

SPECIFICATION forming part of Letters Patent No. 345,924, dated July 20, 1886.

Application filed March 30, 1886. Serial No. 197,137. (No model.)

*To all whom it may concern:*

Be it known that I, CHARLES C. RITTENHOUSE, a citizen of the United States, residing at Hastings, in the county of Adams and State of Nebraska, have invented certain new and useful Improvements in Jails or Prisons; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an improvement in jails or prisons; and it consists in certain details of construction and arrangement of parts hereinafter specifically described, and pointed out in the accompanying drawings.

Its objects are to produce a convenient and secure jail of any desired capacity, to economize space, and to provide means whereby only one prisoner may be brought in contact with the jailer at a time, thereby preventing the possibility of a rush of prisoners for the purpose of overpowering the jailer or effecting an escape. To accomplish these results I provide a series of cells surrounding a central circular space and opening into same, the openings into the cells being adapted to be closed by suitable sliding doors, which will be presently described. Within this central circular space I provide a vertical cylindrical cage having a single opening, and adapted to be revolved for the purpose of operating the cell-doors, and of bringing the opening in the cage to a position corresponding with the opening to either of the cells.

In the drawings, Figure 1 is a plan view of a four-cell jail showing my construction. Fig. 2 is a front elevation of the cylindrical cage and means for revolving same. Fig. 3 is a vertical section through the center of the central circular opening, showing the sliding cell-doors in its walls and means for operating same. Fig. 4 is a bottom view of the floor of the cylindrical cage. Fig. 5 represents the floor of the central circular opening beneath the cage, showing the friction-rollers upon which the cage revolves, and the wheels or pulleys by which the cell-doors are actuated.

Referring more particularly to the drawings, A, Fig. 1, is the main corridor of the jail, leading inward to the central circular space, B, which is surrounded by the cells C C' C² C³ and corridor A.

D represents door-openings from the cells and from the corridor into the central space, and P doors adapted to slide for the purpose of closing these openings.

E represents the vertical cylindrical cage, occupying the entire interior of the central space, B, and provided with a door-opening, F.

G, Figs. 2 and 4, is a beveled cog-wheel secured to the center of the under side of the bottom of cage E, and H a similar beveled cog-wheel mounted on the end of a horizontal shaft, I, extending outward beneath the floor of the corridor A, and meshing into the former, for the purpose of revolving the cage.

On the outer end of the shaft I is mounted a spur-wheel, K, which engages with the cogs of a large vertically-mounted wheel, L, (shown in Figs. 1 and 2,) which may be located within the corridor or without the main exterior wall of the jail-building, and by means of which the shaft connecting the beveled gear G H is operated. This wheel L is provided on its outer rim or circumference with sockets $a$, for a lever or handle, $b$, by means of which it may be turned or actuated. The size of this wheel is so proportioned with relation to its connecting gearing that one complete revolution made by it will turn or revolve the cage once, and in case of a four-cell jail, as here shown, it would be divided into ten parts, each forming one-tenth of the arc of a circle, and two movements of the lever $b$ over this arc would revolve the cage and geared wheels and pulleys for operating sliding cell-doors sufficiently to bring its opening F in line with a cell-opening. The outer rim of the cage E rests upon and is supported by friction-rollers N, (shown in Fig. 5,) whereby it is freely and easily revolved. On the under side of its bottom is secured a plate or segment, $e$, (shown in Fig. 4,) located at one side near its outer rim, the purpose of which will be presently explained. A pair of small wheels or rollers, $i\,i'$, are mounted upon opposite ends of a short horizontal shaft, O, journaled upon the floor of the circular compartment opposite each cell-opening and at right angles with the partition-wall, so that the outer of these rollers, $i'$, is located beneath and forms a support for the bottom of the sliding cell-door, the opposite one on the inner end of the shaft being located beneath and slightly within the outer rim of the cage. Above the cage, and journaled to the ceiling of the central compartment, are similar wheel-shafts corresponding in form and position with those beneath, except that the wheels are provided with spurs or cogs, the outer spur bearing upon the upper edge of the sliding cell-door P, which is toothed or serrated, and the inner designed to engage with a cog-bar, $h$, secured to the cage at or near its top. The sliding doors are confined by guides at top and bottom, forming grooves within which they slide, thereby preventing their being pried out of place by the prisoners. A groove or rabbet is also provided for the same purpose in the jamb for the face or edge of the door when closed.

$ff$ represent projecting springs located within the groove in the door-jamb at top and bottom, which are compressed by the door when closed and locked.

The operation of my device is as follows: Suppose the jail to be unoccupied or empty, the cell-doors open, and the cage so turned as to present its opening F toward the corridor. The prisoners are then conducted through the corridor and placed within the cage. The operator then, by means of lever $b$, turns wheel L one-tenth of a revolution, causing the cage to revolve until its opening F is on a line with cell-opening C. The handcuffs are then removed from one prisoner and he is deposited in the cell. The operator then gives the wheel L a further turn of one-tenth. The cage again revolves, when the plate $e$ on the bottom comes in contact with wheel $i$ on shaft O, causing it to revolve, and with it wheel $i'$, upon which the door rests. At the same instant cog-bar $h$ at the top comes in contact with the inner spur-wheel, $s$, causing it to revolve, and with it the outer wheel, $s'$, engaging with the cogs upon the upper edge of the door, whereby the door is forced forward and closed, the catch $v$ on its front edge serving to hold it tightly in a locked position. The same operation is then repeated until all the prisoners have been disposed of and each cell-door closed in its turn. The cage may now be revolved in either direction without operating the doors, as when closed they are slightly beyond the reach of pulleys $i'$ and spur-wheels $s'$, and are no longer affected by them.

When it is desired to open any one of the doors, the catch $v$ is released and the door unlocked by means of a key, when the springs $ff$, which bear against its face, instantly and automatically force it back a sufficient distance to cause it to again engage with and be actuated by the pulley $i'$ and spur-wheel $s'$, and the revolution of the cage toward the left or reverse direction again slides it open. It will be observed that the segment $e$ on the bottom of cage and cog-bar $h$ near its top, which serve to actuate the sliding doors P by contact with the upper spur-wheel shaft and the lower friction-wheels, $i$ $i'$, occupy a position on the cage to the left of its opening F, so that when the cage is revolved to the right, for the purpose of depositing a prisoner into an open cell, the cage-opening F is brought on a line with the cell-opening before the door-actuating mechanism is brought in operation. When the cage is revolved toward the left, the reverse is the case, the door-actuating mechanism being first brought into play for the purpose of opening the doors. The cage is preferably composed of iron or steel grating, and the sliding doors are of metal suitably braced and stiffened. The hook or lock $v$, for securing the latter when closed, may be of any suitable or desirable construction. It will also be observed that by my construction the sliding cell-doors are actuated by the same operation and machinery used to revolve the cage, and are adapted to be operated separately and independently.

Although I have shown here a four-cell jail for the purpose of illustrating my principle, it is obvious that it may be applied to a jail of any desired capacity containing a greater or less number of cells, and while I have represented a horizontal shaft and gearing as a means of revolving my circular cage, I do not limit myself to that construction, as any other suitable means may be employed.

The advantage obtained by my construction over revolving jails, or jails in which the cells are made to revolve, consists, principally, in its simplicity, cheapness, economy of space, ease of operation, and greater security, as in those heretofore constructed of that class the entire cell structure is made to revolve around a central shaft within an outer fixed cage, and necessarily requires much more force to operate same and more extensive and complicated machinery for the purpose. Besides, more space is required for a corridor entirely surrounding the cell structure and cage, and the cage alone closes the cell-openings and separates the cells from the corridor.

Having thus described my invention, what I claim, and desire to secure by Letters Patent, is—

1. In a jail or prison, the combination, with a series of cells and a corridor surrounding and opening into a central circular space, of a vertical cylindrical cage occupying said central space and having a single opening, said cage being adapted to revolve, whereby its opening may be brought in line with either of the cell-openings and the opening to the corridor, substantially as and for the purpose described.

2. In a jail or prison, the combination, with a series of cells or rooms surrounding a central space and having openings thereto, and sliding doors adapted to close said openings, of a cylindrical cage fitting the central space, adapted to revolve, and connecting mechanism between it and the sliding doors for actuating said doors, substantially as described.

3. In a jail or prison, a series of cells or rooms surrounding and opening into a central space, a series of sliding doors adapted for closing said openings, and a cylindrical cage within said space, provided with suitable means for revolving same, and the friction-pulleys beneath and spur-wheels above the cage and sliding doors, whereby the latter are actuated by the revolution of the cage, all constructed and combined substantially as and for the purpose described.

4. In a jail or prison, a cell or series of cells provided with a sliding door or doors actuated by friction rollers or wheels bearing against said door or doors and revolved by suitable means, and a locking device, whereby said door or doors are held away from contact with their actuating-wheels when closed, substantially as and for the purpose described.

5. In a jail or prison, a cell or cells provided with a sliding door or doors actuated by friction rollers or wheels located in contact with said doors and operated by suitable means, in combination with a locking device, whereby said doors are held away from contact with their actuating-wheels when closed, and springs bearing against their faces, whereby they are automatically thrown in contact with said actuating-wheels when released or unlocked, substantially as and for the purpose described.

In testimony whereof I affix my signature in presence of two witnesses.

CHARLES C. RITTENHOUSE.

Witnesses:
J. C. PARSONS,
JAMES WINNE.